United States Patent
Yu et al.

(10) Patent No.: US 12,200,601 B2
(45) Date of Patent: Jan. 14, 2025

(54) MESSAGE FLOODING PREVENTION IN 5G WIRELESS NETWORK

(71) Applicant: DISH Wireless L.L.C., Englewood, CO (US)

(72) Inventors: Tao Yu, Broadlands, VA (US); Dhaval Mehta, Aldie, VA (US); Farhad Bassirat, Arlington, VA (US); Ash Khamas, Goffstown, NH (US)

(73) Assignee: DISH Wireless L.L.C., Englewood, CO (US)

( * ) Notice: Subject to any disclaimer, the term of this patent is extended or adjusted under 35 U.S.C. 154(b) by 244 days.

(21) Appl. No.: 17/877,604

(22) Filed: Jul. 29, 2022

(65) Prior Publication Data

US 2023/0034448 A1 Feb. 2, 2023

Related U.S. Application Data

(60) Provisional application No. 63/227,533, filed on Jul. 30, 2021.

(51) Int. Cl.
| | |
|---|---|
| *H04W 4/00* | (2018.01) |
| *H04W 40/24* | (2009.01) |
| *H04W 40/28* | (2009.01) |
| *H04W 88/08* | (2009.01) |
| *H04W 92/12* | (2009.01) |

(52) U.S. Cl.
CPC ......... *H04W 40/248* (2013.01); *H04W 40/28* (2013.01); *H04W 88/085* (2013.01); *H04W 92/12* (2013.01)

(58) Field of Classification Search
None
See application file for complete search history.

(56) References Cited

U.S. PATENT DOCUMENTS

| | | | | |
|---|---|---|---|---|
| 2011/0268440 | A1* | 11/2011 | Du | H04Q 11/0005 398/45 |
| 2015/0244840 | A1* | 8/2015 | Chakrabarti | H04L 69/16 370/328 |
| 2015/0245332 | A1* | 8/2015 | Chakrabarti | H04W 72/20 370/329 |
| 2015/0256358 | A1* | 9/2015 | Stapleton | H04W 52/245 370/329 |
| 2016/0094447 | A1* | 3/2016 | Wang | H04W 16/14 370/392 |
| 2016/0119932 | A1* | 4/2016 | Cui | H04W 88/085 370/255 |
| 2016/0192181 | A1* | 6/2016 | Choi | H04W 8/245 455/422.1 |
| 2016/0234773 | A1* | 8/2016 | Choi | H04W 52/0206 |
| 2018/0077006 | A1* | 3/2018 | Cui | H04L 41/40 |
| 2022/0078123 | A1* | 3/2022 | Lin De Medeiros | H04L 47/32 |

* cited by examiner

*Primary Examiner* — Bob A Phunkulh
(74) *Attorney, Agent, or Firm* — KW Law, LLP

(57) ABSTRACT

Automated processes, computing systems, devices and other aspects of a wireless data network are described. According to various embodiments, message flooding in the wireless network is reduced through the use of "dummy" messages from the radio unit (RU) to the distributed unit (DU) and/or layer two (L2) switch. The dummy messages prevent timeout of the RU's data in the L2 switch's routing tables, thereby prolonging the period of time that the L2 switch is able to more efficiently direct subsequent traffic toward that particular device.

20 Claims, 2 Drawing Sheets

MESSAGE FLOODING PREVENTION IN 5G WIRELESS NETWORK

CROSS REFERENCE TO RELATED APPLICATIONS

This application claims priority to U.S. Provisional Application No. 63/227,533 entitled "MESSAGE FLOODING PREVENTION IN 5G WIRELESS NETWORK" and filed on Jul. 30, 2021, which is incorporated herein by reference for any purpose.

TECHNICAL FIELD

The following generally relates to wireless networks, such as 5G wireless data networks. More particularly, the following relates to systems, devices and automated processes to reduce congestion and improve efficiency of 5G and other wireless networks.

BACKGROUND

Wireless networks that transport digital data and telephone calls are becoming increasingly sophisticated. Currently, fifth generation ("5G") broadband cellular networks are being designed and deployed. These 5G networks use emerging technology standards to support data and voice communications with millions, if not billions, of mobile phones, computers, and other devices around the world.

Unlike many prior data and telephone networks that relied upon proprietary designs, many 5G networks comply with industry standards such as the O-RAN Alliance ("O-RAN") standard that describes interactions between the network and the customers' mobile phones and other devices. Networks based upon O-RAN standards have been demonstrated to be highly effective overall.

In certain situations, however, inefficiencies remain. In particular, inefficiencies have been identified in the registration process whereby traffic intended for a particular device that has not recently registered with the network can be broadcast across multiple cells, resulting in undesirable message flooding on the network. It is therefore desirable to create systems, devices and automated processes that can reduce the amount of unnecessary traffic on wireless data networks, without adding unnecessary processing or configuration to network components.

BRIEF SUMMARY

According to various embodiments, message flooding can be reduced by more frequent updating of media access (MAC) information from the radio unit (RU) to the switch or router that directs traffic from the distributed unit (DU). In some implementations, the RU is configured to send periodic "dummy" traffic on the control/user plane so that it remains registered with the router's address tables for longer periods of time. This "dummy" traffic may be sent directly to the router (e.g., a DHCP or similar request that is handled by the router itself) without forwarding to the DU. Alternatively, dummy traffic could be sent through the router to the DU to maintain the device's entry with the router, with the DU being aware that the dummy message can be otherwise ignored. Several solutions to message flooding are described herein, and various embodiments may provide additional systems, devices and automated processes as desired.

An embodiment of an automated process includes the steps of transmitting a first message from a distributed unit to a router and broadcasting the first message from the router to first and second radio units associated with first and second cells, respectively, in response to a routing table of the router lacking a live entry for the first cellular device. The first message is for a first cellular device in an unknown cell. A second message is transmitted from the distributed unit to the router and is for a second cellular device in the first cell. The second message is transmitted from the router to the first radio unit in response to reading a live entry in the routing table that associates the second cellular device with the first cell. A dummy message is transmitted from the first radio unit to the router to extend a timeout of the live entry in the routing table that associates the second cellular device with the first cell.

Some embodiments of a network communication system have processors in communication with non-transitory data storage. The processors are configured to execute instructions stored in the non-transitory data storage that cause the network communication system to perform the automated process to reduce message flooding. A network communications system includes a router maintaining a routing table, a first radio unit associated with a first cell and in network communication with the router, and a second radio unit associated with a second cell and in network communication the router. A distributed unit is in network communication with the router and sends traffic for cellular devices through the router. The router broadcasts a seek message to the first radio unit and the second radio unit in response to receiving a first message for a first cellular device in an unknown cell. The router forwards a second message from the distributed unit to the first radio unit for transmission to a cellular device in the first cell in response to reading a live entry in the routing table that associates the cellular device with the first radio unit. The first radio unit sends a dummy message to the router to maintain the live entry for the first radio unit in the routing table.

In various embodiments, the distributed unit runs on a cloud platform. The automated process may also include the step of forwarding the dummy message from the router to the distributed unit. The distributed unit ignores the dummy message from the first radio unit. The router resets the timeout for the live entry in the routing table in response to receiving the dummy message. The live entry in the routing table comprises a media access control (MAC) address, a virtual local area network (VLAN) identifier, and an associated interface for the first radio unit. The dummy message is formatted to use at least one of a reserved part of an O-RAN Section Type 2 message or a licensed assisted access (LAA) part of O-RAN Section Type 7 messages.

DRAWING FIGURES

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

According to various embodiments, message flooding in the wireless network is reduced through the use of "dummy" messages from the radio unit (RU) that preserve address/interface information in router tables, thereby prolonging the period of time that the router is able to directly contact each RU. This reduces the need for message flooding to reach certain devices that would have otherwise timed out of router address tables. The techniques described herein may be particularly useful in networks in which the user plane ("U plane") is configured to rely upon downlink (DL) only links, although other network configurations could make use of equivalent concepts, as desired.

Figure 1:
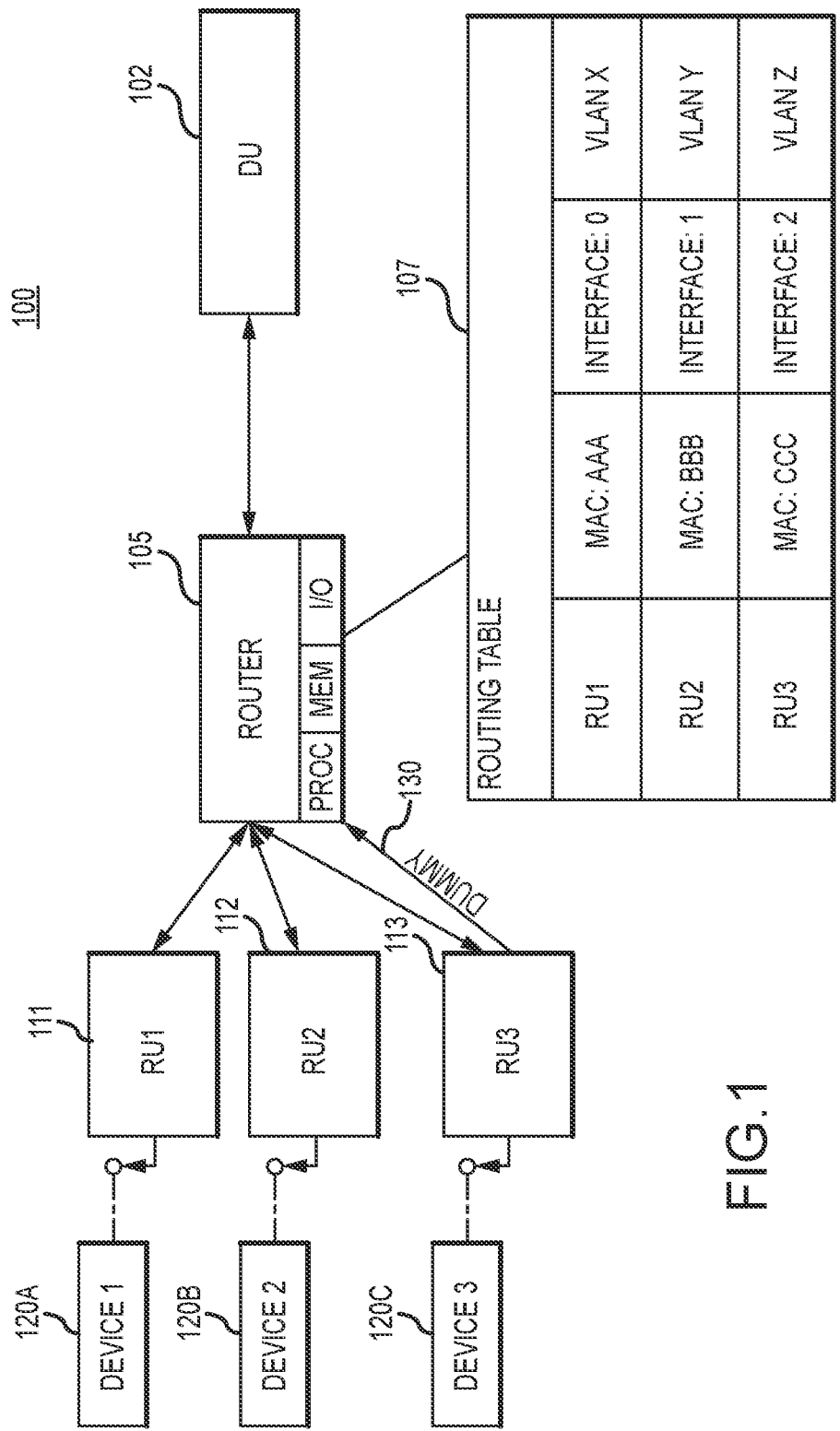
FIG. 1 illustrates a system architecture for implementing a wireless data network with reduced message flooding.

With reference now to FIG. 1, an example portion of a wireless network 100 suitably includes one or more distributed units (DU) 102 that communicate with any number of radio units (RU) 111-113 using a layer two (L2) switch, shown as router 105 in FIG. 1. RUs 111-113 support wireless communications with any number of user devices 120A-C. User devices 120A-C are often mobile phones or other portable devices that can move between different cells associated with the different RUs 111-113. 5G networks are also expected to support home and office computing as well as Internet-of-Things (IoT) and other home-type devices, so many user devices 120A-C may be geographically stationary.

The O-RAN standard breaks communications into three main domains: the radio unit (RU) 111-113 that handles the physical layer of the radio protocol stack, including beamforming; the distributed unit (DU) 102 that handles media access (MAC) layer functions; and the centralized unit (CU) that performs higher level functions, including quality of service (QoS) routing and the like. Each of these components is described in more detail in the O-RAN standards, as updated from time to time, and may be modified as desired to implement the various functions and features described herein.

Each radio unit 111-113 is typically associated with a different wireless cell that provides wireless data communications to user devices 120A-C. RUs 111, 112 and 113 are implemented with conventional telecommunications hardware capable of converting digital data streams for wireless radio transmission via one or more antennas. Generally, RU hardware includes one or more processors, non-transitory data storage (e.g., hard drive or solid-state memory) and appropriate interfaces to perform the various functions described herein. RUs are physically located on-site with the transmitter/antenna, as appropriate.

DU 102 is typically implemented using software or firmware instructions that are stored in a non-transitory data storage (e.g., a disk drive or solid-state memory) for execution by one or more processors. In various embodiments, DUs 102 can be implemented using cloud-based hardware, such as the Amazon Web Service platform provided by Amazon Inc., although other embodiments could use other cloud platforms and/or any type of conventional physical computing hardware, as desired.

As illustrated in FIG. 1, a layer two (L2) switch manages communications between the distributed unit (DU) 102 and one or more radio units (RUs) 111-113. This L2 switch is shown in FIG. 1 as router 105. In some implementations, the router 105 is implemented using a cell site router (CSR) that uses physical or virtual hardware. In many instances, the CSR is located at a radio tower site or the like that is associated with a mobile network operator (MNO). Equivalently, a virtual implementation could run on any cloud platform (e.g., Amazon Web Services (AWS) or the like). Several examples of physical and virtual CSRs are available from Cisco Systems Inc. of San Jose, California, although other embodiments could make use of routing equipment available from any other source, and/or cloud services provided by any other vendor. Other embodiments could equivalently implement the routing using conventional physical routing or switching hardware without the need for cloud support, if desired.

In some O-RAN compliant networks, the management plane ("M-plane") configures the user plane ("U plane") for DL-only packets using a supplemental downlink (SDL) or the like. This allows DUs 102 to receive data traffic and to begin forwarding this traffic to one or more RUs 111-113. Layer two ("L2") switches 105 that route traffic between the DU 102 and one or more RUs 111-113 typically maintain routing tables 107 that associate each RU 111, 112, 113 with its MAC address, virtual local area network (VLAN) identifier, and associated interface. This permits very efficient allocation of bandwidth between UL and DL links.

In networks that rely upon DL-only registration, however, the router 105 will not typically learn the MAC address associated with an RU 111-113 until an uplink (UL) response is received. Until this first response from the RU is received and the L2 switch 105 learns the address, VLAN, and interface, the L2 switch 105 can only reach a desired RU 111-113 by forwarding the traffic on each of the available interfaces (i.e., for broadcast to each RU 111, 112, 113). This creates unnecessary traffic on all of the cells associated with DU 102. Moreover, if additional traffic is received for the same RU, this additional traffic will typically be broadcast across all of the RUs 111-113 until an uplink message is received from the appropriate RU 111-113. After router 105 receives the UL message from the appropriate RU 111-113, then it can update table 107 and limit subsequent traffic for that RU to the associated interface, thereby reducing unused traffic on the other interfaces. This is described in increasing detail below with respect to FIG. 2.

Generally, router 105 refreshes the data in table 107 on a regular basis (e.g., every five minutes or so, although other embodiments may use other regular or irregular refresh periods). In a typical configuration, if no traffic is received from an RU 111-113 during the refresh period, then the RU's entry in table 107 is removed. If subsequent traffic for that RU 111-113 is then received from DU 102, the switch 105 would need to broadcast traffic for that device on each of its interfaces (e.g., to each RU 111-113) until a subsequent UL message is received to update table 107.

The need for such "flooding" broadcasts can be reduced, however, through the use of dummy messages 130 from each RU 111-113. Even if the RU 111-113 remains otherwise inactive during the refresh period of table 107, RU 111-113 can be configured to send a message 130 to router 105 and/or DU 102 to maintain its registration in table 107. This will prevent unnecessary timeouts that would otherwise result in a broadcast "flood" upon receipt of subsequent DL traffic for that RU 111-113.

The "dummy" messages 130 can take any number of different forms. In some embodiments, dummy messages 130 can be control plane (C-plane) or similar messages sent from the RU 111-113 to the DU 102 in any manner. C-plane messages could be formatted to use the "reserved" portion of O-RAN Section Type 2 message, for example, or the "licensed assisted access" (LAA) features of O-RAN Section Type 7 messages, as desired. Equivalent embodiments could use any other unused portion of any conventional messages, as desired. Generally speaking, the router 105 will recognize these dummy C-plane messages 130 as UL traffic that will maintain that device's entry in table 107 as desired. The DU 102 may be programmed to ignore these C-plane messages, or the received data could be used for other purposes if desired.

In other embodiments, it may not be necessary or desirable to transmit messages 130 to the DU 102 to maintain router table data 107. Certain network protocols, for example, may be processed directly by the router 105 without contacting DU 102. Router 105 may be programmed to directly process dynamic host configuration protocol (DHCP) traffic, for example. In this case, an RU 111-113 may send a DHCP message (e.g. a discover or the like) using a C/U-Plane VLAN ID tag that is assigned by DU 102 or another RU controller. In this case, router 105 can treat the DHCP message sent by the RU 111-113 as a "dummy" message 130, without necessarily responding to the DHCP request itself. That is, router 105 can simply discover the RU's MAC address and VLAN identification from DHCP message, which can then be used to preserve that device's entry in table 107. Other protocols could be equivalently used in place of DHCP. The point-to-point protocol (PPP), for example, supports a "keepalive" function that could support messages 130, if desired. Dummy messages 120 may therefore be transmitted from RUs 111, 112 and 113 to router 105 and/or DU 102 in any manner.

Figure 2:
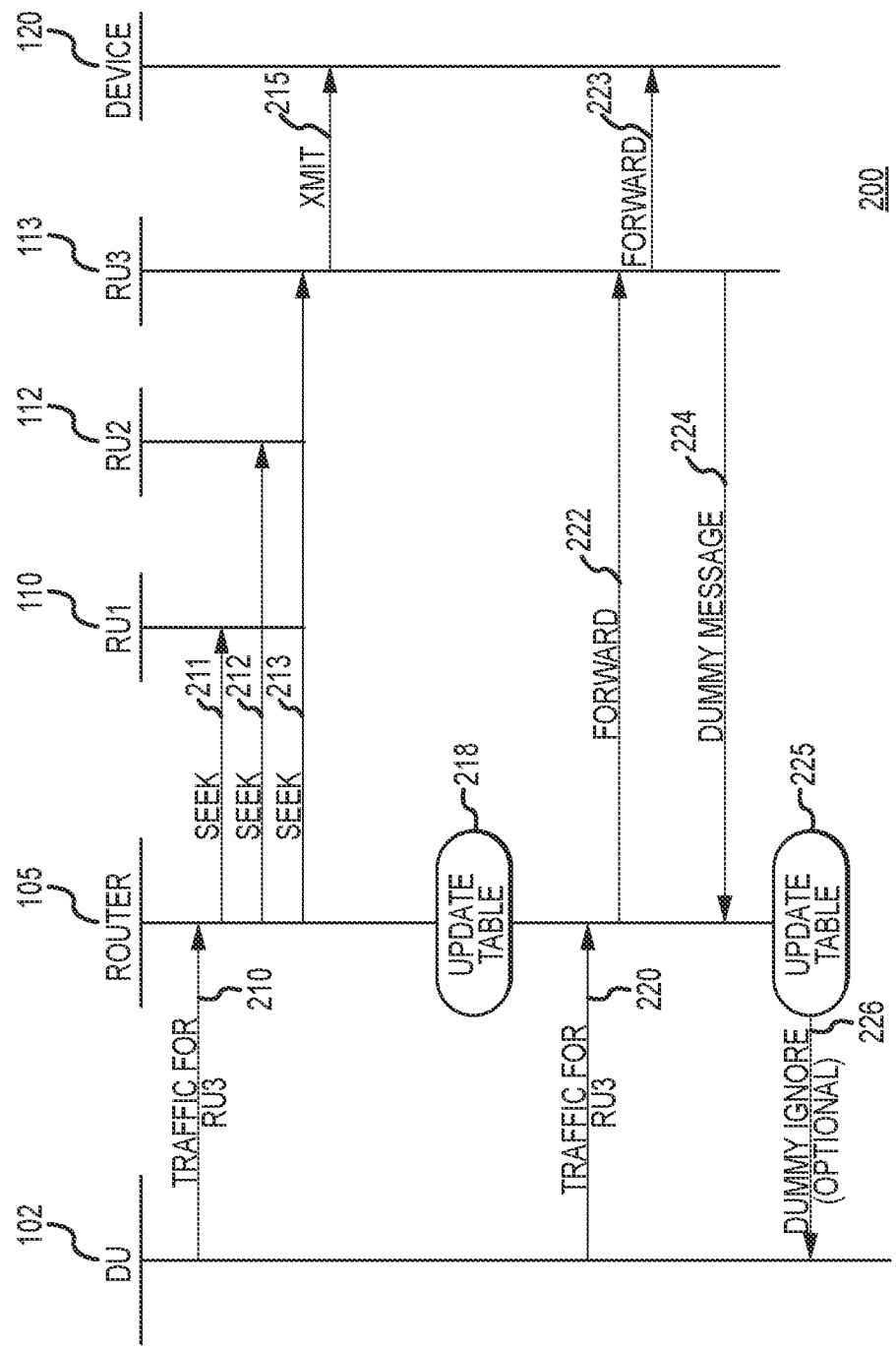
FIG. 2 illustrates data flow and various processes performed by components of a wireless data network to reduce message flooding.

FIG. 2 shows an example of an automated process 200 performed by DU 102, router 105, RUs 111-113 and a particular user device 120. Process 200 attempts to avoid message "flooding" caused by redundant broadcasts 211, 212, 213 on different RU cells. This flooding can be reduced through the use of dummy messages 224, 226 that force router 105 to update routing table 107 (function 225).

As discussed above, message "flooding" can occur when router 105 (or any equivalent L2 switch) receives a message 210 associated with an RU 111-113 that is not yet recognized in the switch's routing table 107. Because router 105 does not yet know which interface to reach the particular RU, it forwards the received traffic on each of its available interfaces as redundant messages 211, 212, 213 to RUs 111, 112 and 113, respectively. Each RU 111, 112, 113 then broadcasts the message 215 on its own cell in hopes of reaching the desired user device 120.

Typically, user device 120 will communicate with only one cell that is associated with just one RU. In the example of FIG. 2, user device 120 is operating in the cell associated with RU3 113. Although each RU 111-113 will re-transmit messages 211, 212, 213, only the re-transmission 215 from RU 113 will be receivable by user device 120.

Router 105 can forward subsequent messages 220 received for that RU 113 on only the desired interface (message 222). RU 113 may format the received message for wireless transmission on the cell (message 223), as appropriate. Since RU 113 is now recognized in table 107, router 105 no longer forwards traffic intended for RU 113 to the interfaces associated with other RUs 111, 112, thereby reducing "flooding" of unnecessary messages on those cells.

As described above, it is generally desirable to prevent premature timeout of entries in table 107. Each RU 111, 112, 113 is therefore configured to transmit dummy messages 120 as described above. In FIG. 2, dummy message 120 is implemented using message 224 from RU3 113 to router 105. As noted above, the regular receipt of these dummy messages will cause router 105 to maintain the information about device 120 in table 107 (function 225), thereby avoiding unnecessary timeout that would otherwise create a need for re-broadcasts by each RU 111, 112, 113.

As noted above, the dummy message 120 is intended primarily for router 105, and not necessarily for DU 102. In practice, message 224 may be implemented as a network request or keepalive packet transmitted directly to router 105. Equivalently, message 224 may take the form of a C-plane or similar message that is directed toward DU 102, but that is nevertheless received and processed by router 105 during transit. In FIG. 2, this transit to DU 102 is indicated by message 226. As discussed above, DU 102 may be programmed to ignore certain types of C-plane messages that are associated with dummy messages 120, as desired. Other embodiments could implement dummy messages 120 using any other types of data traffic 224 and/or 226, as desired.

Each of the various devices 102, 105, may be implemented using cloud-type hardware that abstracts the processor, non-transitory data storage and conventional input/output interfaces that are found in traditional computing hardware. RUs 111-113 will generally be implemented using specialized telecommunications hardware, including processors, non-transitory data storage and conventional input/output interfaces that are typically used within the wireless industry. Generally speaking, the various devices 102, 105 and 111-113 will format messages and perform the various functions shown in the diagram under the control of computer-executable instructions (e.g., software or firmware code) that are stored in non-transitory storage for execution by one or more processors. Equivalent embodiments could use any types of computing and/or routing hardware, including any combination of conventional and cloud-based hardware.

A wireless communications system therefore uses dummy messages sent from one or more RUs to retain routing table data and thereby prevent subsequent message flooding on other cells. The system comprises several data processing components, each of which are patentable, and/or have patentable aspects, and/or have processing hardware capable of performing automated processes that are patentable. This document is not intended to limit the scope of any claims or inventions in any way, and the various components and aspects of the system described herein may be separately implemented apart from the other aspects.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the invention is accordingly to be limited by nothing other than the appended claims, in which reference to an element in the singular is not intended to mean "one and only one" unless explicitly so stated, but rather "one or more." Moreover, where a phrase similar to "A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

References to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or device that comprises a list of elements does not include only those elements but may include other elements not expressly listed or inherent to such process, method, article, or device.

What is claimed is:

1. An automated process comprising:
   transmitting a first message from a distributed unit to a router, wherein the first message is for a first cellular device in an unknown cell;
   broadcasting the first message from the router to a first radio unit associated with a first cell and a second radio unit associated with a second cell in response to a routing table of the router lacking a live entry for the first cellular device;
   transmitting a second message from the distributed unit to the router, wherein the second message is for a second cellular device in the first cell;
   transmitting the second message from the router to the first radio unit in response to reading a live entry in the routing table that associates the second cellular device with the first cell; and
   transmitting a dummy message from the first radio unit to the router to extend a timeout of the live entry in the routing table that associates the second cellular device with the first cell.

2. The automated process of claim 1, wherein the distributed unit runs on a cloud platform.

3. The automated process of claim 1, further comprising forwarding the dummy message from the router to the distributed unit.

4. The automated process of claim 3, wherein the distributed unit ignores the dummy message from the first radio unit.

5. The automated process of claim 1, wherein the router resets the timeout for the live entry in the routing table in response to receiving the dummy message.

6. The automated process of claim 1, wherein the live entry in the routing table comprises a media access control (MAC) address, a virtual local area network (VLAN) identifier, and an associated interface for the first radio unit.

7. The automated process of claim 1, wherein the dummy message if formatted to use at least one of a reserved part of an O-RAN Section Type 2 message or a licensed assisted access (LAA) part of O-RAN Section Type 7 messages.

8. A network communication system having processors in communication with non-transitory data storage, wherein the processors are configured to execute instructions stored in the non-transitory data storage that cause the network communication system to perform operations, comprising:
   transmitting a first message from a distributed unit to a router, wherein the first message is for a first cellular device in an unknown cell;
   broadcasting the first message from the router to a first radio unit associated with a first cell and a second radio unit associated with a second cell in response to a routing table of the router lacking a live entry for the first cellular device;
   transmitting a second message from the distributed unit to the router, wherein the second message is for a second cellular device in the first cell;
   transmitting the second message from the router to the first radio unit in response to reading a live entry in the routing table that associates the second cellular device with the first cell; and
   transmitting a dummy message from the first radio unit to the router to extend a timeout of the live entry in the routing table that associates the second cellular device with the first cell.

9. The network computing system of claim 8, wherein the operations further comprise forwarding the dummy message from the router to the distributed unit.

10. The network computing system of claim 9, wherein the distributed unit ignores the dummy message from the first radio unit.

11. The network computing system of claim 8, wherein the router resets the timeout for the live entry in the routing table in response to receiving the dummy message.

12. The network computing system of claim 8, wherein the live entry in the routing table comprises a media access control (MAC) address, a virtual local area network (VLAN) identifier, and an associated interface for the first radio unit.

13. The network computing system of claim 8, wherein the dummy message if formatted to use at least one of a reserved part of an O-RAN Section Type 2 message or a licensed-assisted-access part of an O-RAN Section Type 7 message.

14. A network communications system comprising:
   a router maintaining a routing table;
   a first radio unit from a plurality of radio units, wherein the first radio unit is associated with a first cell and in network communication with the router;
   a second radio unit from the plurality of radio units, wherein the second radio unit is associated with a second cell and in network communication the router; and
   a distributed unit in network communication with the router, wherein the distributed unit sends traffic for cellular devices through the router,
      wherein the router broadcasts a seek message to the first radio unit and the second radio unit in response to receiving a first message for a first cellular device in an unknown cell,
      wherein the router forwards a second message from the distributed unit to the first radio unit for transmission to a cellular device in the first cell in response to reading a live entry in the routing table that associates the cellular device with the first radio unit, and
      wherein the first radio unit sends a dummy message to the router to maintain the live entry for the first radio unit in the routing table.

15. The network computing system of claim 14, wherein the router forwards the dummy message to the distributed unit.

16. The network computing system of claim 15, wherein the distributed unit ignores the dummy message from the first radio unit.

17. The network computing system of claim 14, wherein the router resets a timeout for the live entry in the routing table in response to receiving the dummy message.

18. The network computing system of claim 14, wherein the live entry in the routing table comprises a media access control (MAC) address, a virtual local area network (VLAN) identifier, and an associated interface for the first radio unit.

19. The network computing system of claim 14, wherein the dummy message is formatted to use at least one of a reserved part of an O-RAN Section Type 2 message or a licensed-assisted-access part of an O-RAN Section Type 7 message.

20. The network computing system of claim 14, wherein the distributed unit runs on a cloud platform.

* * * * *